(12) United States Patent
Tamaki et al.

(10) Patent No.: US 8,106,344 B2
(45) Date of Patent: Jan. 31, 2012

(54) COMPOUND EYE CAMERA MODULE

(75) Inventors: Satoshi Tamaki, Kanagawa (JP);
Tatsutoshi Suenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/595,992

(22) PCT Filed: Feb. 18, 2009

(86) PCT No.: PCT/JP2009/000679
§ 371 (c)(1),
(2), (4) Date: Oct. 15, 2009

(87) PCT Pub. No.: WO2009/104394
PCT Pub. Date: Aug. 27, 2009

(65) Prior Publication Data
US 2010/0127157 A1 May 27, 2010

(30) Foreign Application Priority Data
Feb. 18, 2008 (JP) ................................. 2008-035585

(51) Int. Cl.
*H01L 27/00* (2006.01)
(52) U.S. Cl. .................................... 250/208.1; 348/152
(58) Field of Classification Search ............... 250/208.1, 250/226, 559.08; 348/152–155, 223.1, 280, 348/297, 308, 262; 396/306–308, 322, 323, 396/335
See application file for complete search history.

(56) References Cited

U.S. PATENT DOCUMENTS

| 7,411,733 B2* | 8/2008 | Toyoda et al. | 250/208.1 |
| 7,453,056 B2* | 11/2008 | Toyoda et al. | 250/208.1 |
| 7,525,081 B2* | 4/2009 | Toyoda et al. | 250/208.1 |
| 7,865,076 B2* | 1/2011 | Tamaki et al. | 396/308 |
| 2003/0086013 A1 | 5/2003 | Aratani | |

FOREIGN PATENT DOCUMENTS

| JP | 2005-109092 | 4/2005 |
| JP | 2006/080597 | 3/2006 |
| JP | 2006-080597 | 3/2006 |
| JP | 2006/246193 | 9/2006 |
| WO | 2007/125761 | 11/2007 |

OTHER PUBLICATIONS

International Search Report for corresponding application No. PCT/JP2009/000679 mailed Mar. 3, 2009.

* cited by examiner

*Primary Examiner* — Seung C Sohn
(74) *Attorney, Agent, or Firm* — Renner, Otto, Boisselle & Sklar, LLP

(57) ABSTRACT

A compound eye camera module according to the present invention includes a lens array including at least two lenses; an imaging element having two imaging areas corresponding to the two lenses; a light shielding block having a light shielding wall for separating optical paths of light transmitted through the two lenses; an optical filter for transmitting light of a specific wavelength range among the light transmitted through the two lenses; and a substrate having an opening larger than the optical filter. The imaging areas and the optical filter are located at a position corresponding to the opening. The imaging element is fixed to a face of the substrate opposite to the side of the lens array. The imaging element is in contact with a face of the optical filter which faces the imaging element. The light shielding block is fixed to a face of the optical filter which faces the light shielding block. The optical filter has portions protruding outside both of ends of the imaging element in a direction connecting the two optical axes of the two lenses. The light shielding block is fixed to the protruding portions of the optical filter.

8 Claims, 12 Drawing Sheets

FIG.2
(a) 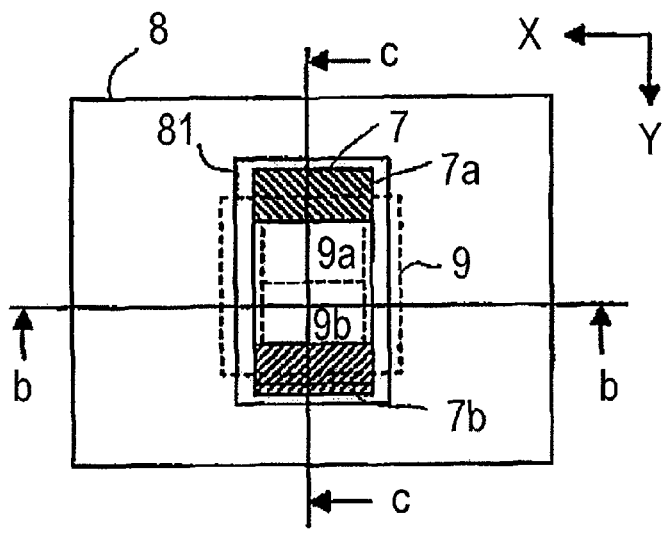
(b) 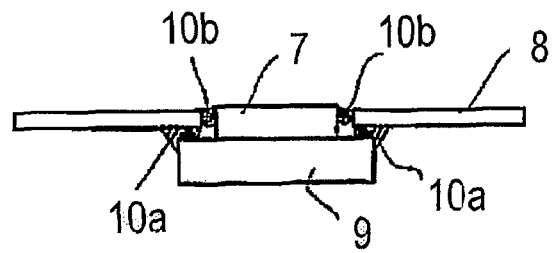
(c) 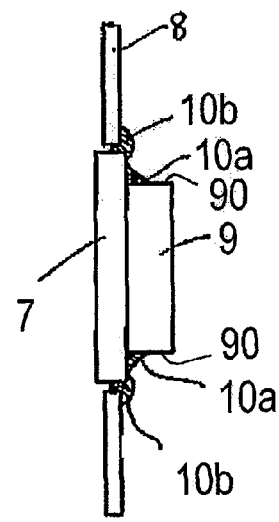

(a) (b)

(a) (b)

COMPOUND EYE CAMERA MODULE

TECHNICAL FIELD

The present invention relates to a camera module, and specifically to a compound eye system camera module for taking an image of a subject using a plurality of lenses having different optical axes from each other.

BACKGROUND ART

An imaging device such as a digital video device or a digital camera forms an image of a subject on an imaging element such as a CCD (Charge Coupled Device), a CMOS (Complementary Metal-Oxide Semiconductor) or the like via a lens to convert the image of the subject into two-dimensional image information. A camera for measuring the distance to the subject is also proposed.

With reference to FIG. 16 and FIG. 17, an example of a compound eye system camera module for measuring a distance to a subject, which is disclosed in Patent Document 1, will be described. FIG. 16 is an exploded isometric view of the compound eye system camera module, and FIG. 17 is a cross-sectional view thereof.

Sequentially from the side of the subject, a aperture member 1121, a lens array 1122, a light shielding block 1123, an optical filter array 1124, and a semiconductor substrate 1125 are located. The semiconductor substrate 1125 has an imaging area 1126 formed thereon, and also has a driving circuit 1127 and a signal processing circuit 1128 formed thereon. The lens array 1122 includes a plurality of lenses. The aperture member 1121 has aperture (openings) at positions respectively matching the optical axes of the lenses of the lens array 1122. The optical filter array 1124 includes a plurality of optical filters in an area corresponding to each of the lenses of the lens array 1122. The optical filter array 1124 is formed of a plurality of types of optical filters having different spectral characteristics, and faces the imaging area 1126 with a space sandwiched therebetween. The light shielding block 1123 includes a light shielding wall 1123a at a position matching the border between each two adjacent lenses of the lens array 1122, namely, the border between each two adjacent optical filters of the optical filter array 1124.

The compound eye camera module having such a structure obtains a plurality of images having parallax, calculates a parallax amount from the images having parallax, and calculates a distance to the subject based on the parallax amount.

Patent Document 1: Japanese Laid-Open Patent Publication No. 2003-143459

DISCLOSURE OF THE INVENTION

Problems to be Solved by the Invention

However, as shown in FIG. 17, the above-described compound eye camera module has the problem that unnecessary incident light (unnecessary light) 1172 is reflected by an inner wall of the light shielding block 1123 or end faces of the optical filter array 1124 and is imaged in the imaging area 1126 as a ghost image, which significantly decreases the distance measuring accuracy.

The present invention provides a compound eye camera module which is compact and thin, has a short base, and has a high distance measuring accuracy.

Means for Solving the Problems

A compound eye camera module according to the present invention comprises a lens array including at least two lenses having different optical axes from each other and located on the same plane; an imaging element having two imaging areas corresponding one-to-one to the two lenses; a light shielding block located between the lens array and the imaging element and having a light shielding wall for separating optical paths of light transmitted through the two lenses; an optical filter located between the light shielding block and the imaging element for transmitting light of a specific wavelength range among the light transmitted through the two lenses; and a substrate having an opening larger than the optical filter. The imaging areas and the optical filter are located at a position corresponding to the opening. The imaging element is fixed to a face of the substrate opposite to the side of the lens array. The imaging element is in contact with a face of the optical filter which faces the imaging element. The light shielding block is fixed to a face of the optical filter which faces the light shielding block. The optical filter has portions protruding outside both of ends of the imaging element in a direction connecting the two optical axes of the two lenses. The light shielding block is fixed to the protruding portions of the optical filter.

In an embodiment, the imaging element has portions protruding outside both of ends of the opening in the direction connecting the two optical axes; and the protruding portions of the imaging element and the substrate are fixed to each other.

In an embodiment, the imaging element has a terminal to be electrically connected to the substrate; and the imaging areas and the terminal are located on the same face of the imaging element.

In an embodiment, an inner wall of the light shielding block in a range in which the light shielding wall is provided is located outer to both of the ends of the imaging element in the direction connecting the two optical axes.

In an embodiment, the two lenses are positioned with respect to the light shielding block.

In an embodiment, the face of the optical filter which faces the imaging element is in contact with the imaging face of the imaging element.

In an embodiment, the imaging element is bonded, along an outer perimeter thereof, to the substrate and the optical filter; and the optical filter is bonded, along an outer perimeter thereof, to the substrate.

In an embodiment, the imaging element is bonded, along an outer perimeter thereof, to the substrate and the optical filter; the opening has a shape substantially the same as an external shape of the optical filter; and at least a part of the optical filter is located inside the opening.

EFFECTS OF THE INVENTION

According to the present invention, the inner wall of the light shielding block and the end faces of the optical filter can be distanced from the imaging areas. Therefore, unnecessary light can be prevented from being incident on the imaging areas. Owing to this, an error of the distance measuring result can be reduced and the distance measuring accuracy can be improved.

Also according to the present invention, the relative tilt of the imaging element and the imaging optical system can be suppressed.

BRIEF DESCRIPTION OF THE DRAWINGS

FIGS. 2(a) through (c) show an imaging element and the vicinity thereof of the compound eye camera module according to Embodiment 1 of the present invention.

DESCRIPTION OF THE REFERENCE NUMERALS

Figure 1:
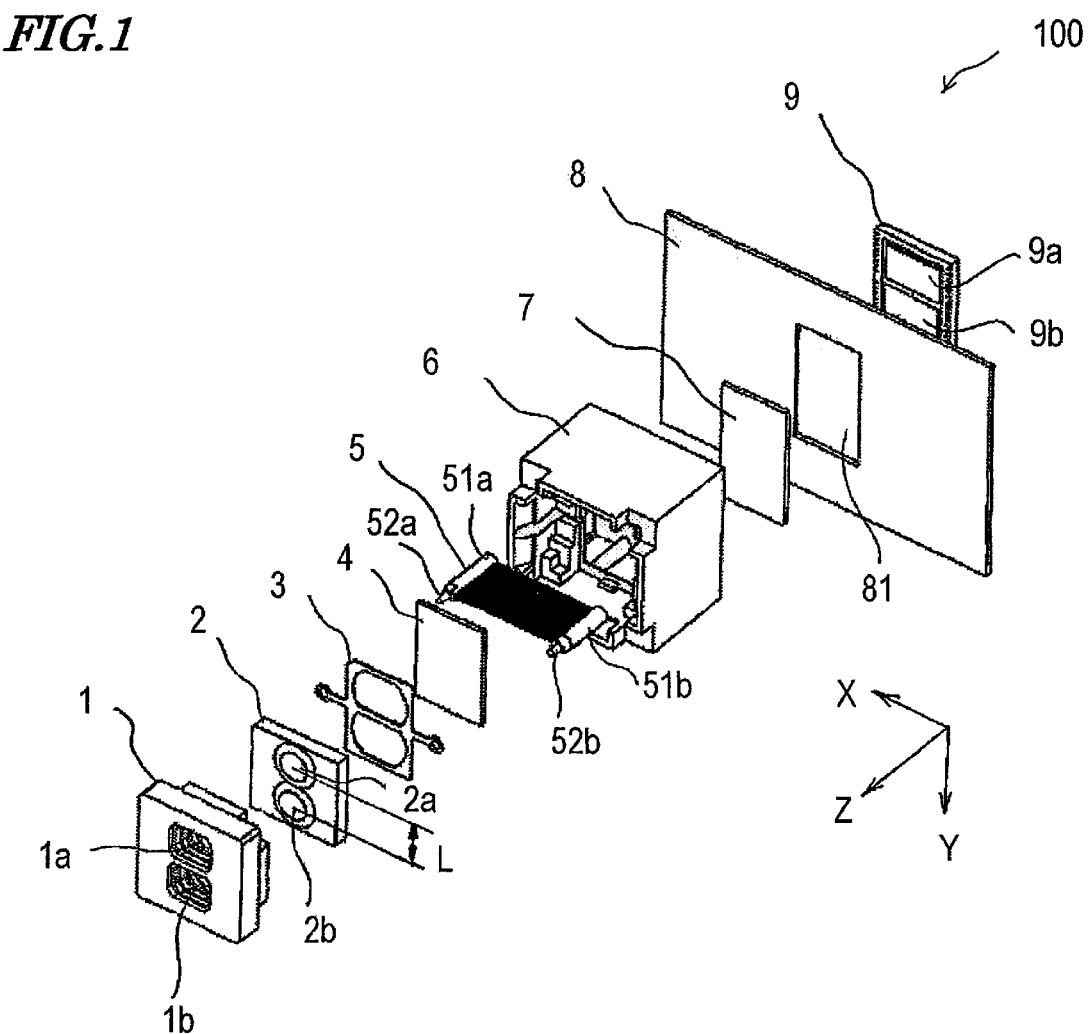
FIG. 1 is an exploded isometric view of a compound eye camera module according to Embodiment 1 of the present invention.

1 Upper mirror cylinder
2 Lens array
3 Light shielding film
4 Second optical filter
5 Light shielding wall
6 Light shielding block
7 First optical filter
8 Substrate
9 Imaging element
1a, 1b Aperture
2a, 2b Lens
9a, 9b Imaging area 13, 14, 15 Reference plane of the upper mirror cylinder
22, 23, 24 Reference plane of the lens
61, 62, 63, 64b, 65a, 65b Reference plane of the light shielding block
7a, 7b Reference plane of the first optical filter

BEST MODE FOR CARRYING OUT THE INVENTION

Hereinafter, a compound eye camera module according to embodiments of the present invention will be described with reference to the drawings.

Embodiment 1

FIG. 1 is an exploded isometric view of a compound eye camera module 100 according to Embodiment 1 of the Present invention. FIG. 1 shows elements of the compound eye camera module 100. The compound eye camera module 100 includes, sequentially from the side of a subject, an upper mirror cylinder 1, a lens array 2, a light shielding film 3, a second optical filter 4, a light shielding wall 5, a light shielding block 6, a first optical filter 7, a substrate 8, and an imaging element 9.

In the description of the embodiments of the present invention, an XYZ Cartesian coordinate system as shown in FIG. 1 is set for explaining directions. The Z axis is vertical to an imaging face of the imaging element 9. The Y axis crosses the Z axis perpendicularly and is parallel to a direction connecting optical axes of two lenses of the lens array 2. The X axis crosses the Y axis and the Z axis perpendicularly.

The lens array 2 includes at least two lenses having different optical axes from each other and located on the same plane. In this embodiment, the lens array 2 integrally includes two single lens 2a and 2b which are located on the same plane, which is parallel to the XY plane. An optical axis 20a of the lens 2a (FIG. 10(a)) and an optical axis 20b of the lens 2b are parallel to the Z axis and are distanced from each other by base length L mm in the Y axis direction. The lenses 2a and 2b are designed to, for example, fulfill the optical specifications such as MTF or the like which are required of light in a green wavelength range.

The lenses 2a and 2b each form an image of light from a subject (not shown) on the imaging element 9 via the second optical filter 4 and the first optical filter 7.

The second optical filter 4 is formed of, for example, a thin film including a dielectric multi-layer film which is provided on a face of a glass substrate. The second optical filter 4 is located between the lens array 2 and the light shielding block 6. The second optical filter 4 is, for example, an infrared cut filter and shields light in a near infrared wavelength range.

The first optical filter 7 is formed of, for example, a thin film including a dielectric multi-layer film which is provided on a face of a glass substrate. The first optical filter 7 is in contact with the imaging face of the imaging element 9. The first optical filter 7 is an optical filter for transmitting, for example, light of a green wavelength range and light of a near infrared wavelength range.

Accordingly, the compound eye camera module 100 forms an image of only a light beam in the green wavelength range on the imaging element by providing both the first optical filter and the second optical filter.

The imaging element 9 is an imaging sensor such as a CCD sensor, a CMOS sensor or the like, and includes a great number of pixels arranged two-dimensionally in length and width directions. An effective pixel area of the imaging element 9 is divided into two imaging areas 9a and 9b. The two imaging areas 9a and 9b correspond one-to-one to the two lenses 2a and 2b, and are located on the optical axes thereof.

Accordingly, the light beam transmitted through the lens 2a is transmitted through the second optical filter 4 and the first optical filter 7 to form an image in the imaging area 9a, and the light beam transmitted through the lens 2b is transmitted through the second optical filter 4 and the first optical filter 7 to form an image in the imaging area 9b. Namely, an image of the subject of a green component is independently formed in each of the two imaging areas 9a and 9b.

Each of the pixels forming the imaging areas 9a and 9b of the imaging element 9 performs photoelectric conversion on the incident light and outputs an electric signal (not shown) in accordance with the strength of the light.

The imaging element 9 is flip-chip-mounted face down on the substrate 8 having an opening larger than the imaging areas as shown in FIG. 1, and is connected to an electric circuit formed on the substrate 8. An electric signal which is output from the imaging element 9 is subjected to various image processing. For example, two images taken by the imaging areas 9a and 9b of the light of the green wavelength range can be used to find a parallax amount between the two images and thus to measure the distance to the subject. Such processing can be performed using a digital signal processor (DSP, not shown) or the like. Image processing and distance measurement processing using the output electric signal can be performed by known technologies, and so the detailed descriptions thereof are omitted here.

The distance to the subject from the compound eye camera module 100 can be measured as follows. Images obtained from the imaging areas 9a and 9b are used to find a parallax amount based on triangulation by arithmetic operation processing such as block matching or the like, and the distance to the subject is measured using the parallax amount. However, the parallax amount found by the arithmetic operation may have an error due to an assembly variance. Such an error occurs due to a factor such as the relative tilt between the lens array 2 and the imaging element 9, the relative tilt between the optical filters 4 and 7 and the imaging element 9, the focal point deviation of the lenses 2a and 2b, the diaphragm decentration between apertures 1a and 1b provided in the upper mirror cylinder, or the like.

By adopting the shape of each element and the assembly process according to embodiments of the present invention, such factors of the error can be suppressed and the accuracy of the parallax extraction, namely, the distance measurement, can be improved.

With reference to FIG. 2(a) through FIG. 2(c), a structure of the first optical filter 7, the imaging element 9 and the substrate 8 will be described.

FIG. 2(a) is a front view of the first optical filter 7 and the imaging element 9 mounted on the substrate 8 as seen from the side of the subject. FIG. 2(b) is a cross-sectional view of FIG. 2(a) taken along line b-b thereof. FIG. 2(c) is a cross-sectional view of FIG. 2(a) taken along line c-c thereof.

In the substrate 8, an opening 81 having substantially the same size as that of the first optical filter 7 is formed. Into the opening 81, at least a part of the first optical filter 7 is fitted. As can be seen from FIG. 2(b), the imaging element 9 is flip-chip-mounted face down on the substrate 8, and is electrically connected to the electric circuit formed on the substrate 8. In the state where the first optical filter 7 is in contact with the imaging face of the imaging element 9, an adhesive 10a is flown so as to surround the imaging element 9. Thus, the imaging element 9 is mechanically fixed to the substrate 8 and the first optical filter 7 which are in contact with each other.

This prevents dirt, dust and the like from entering the imaging face of the imaging element 9. The imaging element 9 has an electrode formed in the vicinity of each of right and left ends on a top face in the cross-sectional view in FIG. 2(b). Owing to the imaging element 9 being flip-chip-mounted, these electrodes are connected to the electrodes formed on a bottom face of the substrate 8.

The first optical filter 7 has the following external shape. Regarding the width in the X direction, the first optical filter 7 is longer than the imaging areas 9a and 9b of the imaging element 9 and is shorter than the inter-electrode distance of the imaging element 9. As is clear from FIG. 2(c), regarding the width in the Y direction, the first optical filter 7 is longer than the imaging element 9. Owing to this, the first optical filter 7 has portions protruding outside both of ends 90 of the imaging element 9 in the Y direction. The Y direction is the direction of the base of the two lenses 2a and 2b, and is the same as a direction in which information is read from the pixels of the imaging element 9.

As described above, the first optical filter 7 is fitted into the opening 81 formed in the substrate 8, and is in contact with the imaging face of the imaging element 9 flip-chip-mounted on the substrate 8. In this state, the first optical filter 7 is fixed, along a perimeter thereof, to the substrate 8 with an adhesive 10b.

Accordingly, as shown in FIG. 2(b), the imaging element 9 is fixed, along a perimeter thereof, to the substrate 8 with the adhesive 10a; and the first optical filter 7 is fixed, along the perimeter thereof, to the substrate 8 with the adhesive 10b. Owing to this structure, the imaging face of the imaging element 9 is covered tightly with the substrate 8 and the first optical filter 7, and can be protected against adhesion of dirt from outside.

Since the first optical filter 7 is bonded to the substrate 8, there is no need to provide a space for bonding the first optical filter 7 in the imaging element 9. Therefore, the module can be compact.

In the above structure, the first optical filter 7 is fitted into the opening 81 of the substrate 8, and the first optical filter 7 is bonded, along the perimeter thereof, to the substrate 8. Even where the first optical filter 7 is merely fitted or bonded, as long as the imaging face of the imaging element 9 is covered tightly, the imaging face can be protected against adhesion of dirt or the like.

Figure 3:
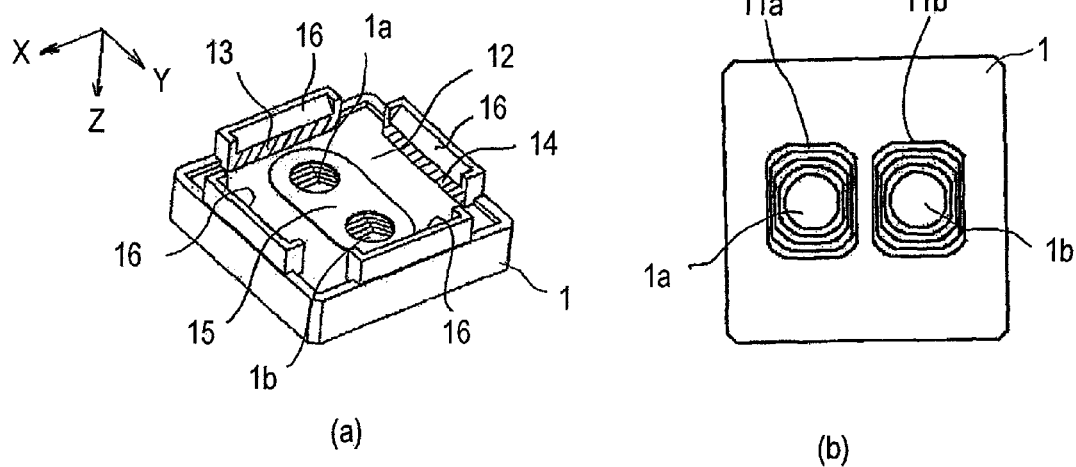
FIGS. 3(a) and (b) show an upper mirror cylinder of the compound eye camera module according to Embodiment 1 of the present invention.

FIG. 3(a) is an isometric view of the upper mirror cylinder 1 as seen from the side of the imaging element 9. The upper mirror cylinder 1 has, on the side of the imaging element 9, a recess 12 for holding and fixing the lens array 2. The upper mirror cylinder 1 also has the two apertures (openings) 1a and 1b at positions through which the optical axes of the two lenses 2a and 2b of the held lens array 2 pass. The upper mirror cylinder 1 is formed of a light non-transmissive material, and prevents unnecessary external light from being incident on the lenses 2a and 2b except through the apertures 1a and 1b. The true positions of the apertures 1a and 1b in the X direction and the Y direction are regulated based on reference planes 13 and 14, and the apertures 1a and 1b are located on a straight line in the Y direction.

FIG. 3(b) is a front view of the upper mirror cylinder 1 as seen from the side of the subject. The upper mirror cylinder 1 includes the apertures 1a and 1b, and also hoods 11a and 11b for shielding entrance of unnecessary external light at an angle of view no less than a preset angle. The hoods are generally rectangular in conformity with the angles of view in the horizontal, vertical and diagonal directions designed for the lenses 2a and 2b.

Figure 4:
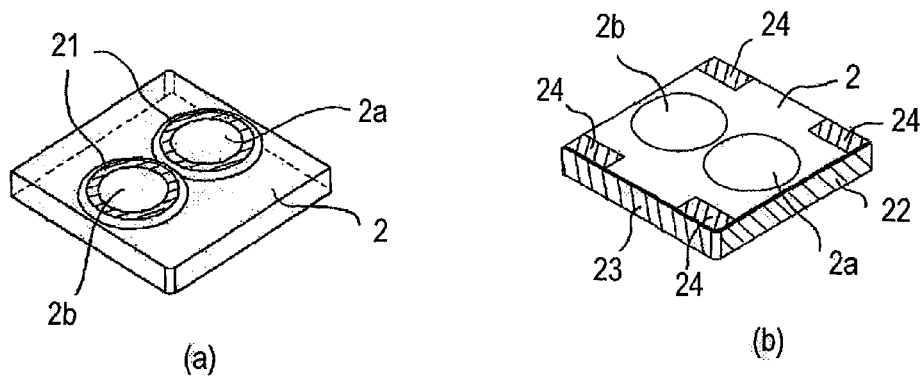
FIGS. 4(a) and (b) show a lens array of the compound eye camera module according to Embodiment 1 of the present invention.

FIG. 4(a) is an isometric view of the lens array 2 as seen from the side of the subject. FIG. 4(b) is an isometric view of the lens array 2 as seen from the side of the imaging element 9. The true positions of the lenses 2a an 2b in the X direction and the Y direction are regulated based on reference planes 22 and 23, and the lenses 2a an 2b are located on a straight line in the Y direction.

By putting the reference plane 13 in the recess 12 of the upper mirror cylinder 1 into contact with the reference plane 22 of the lens array 2, and by putting the reference plane 14 of the upper mirror cylinder 1 into contact with the reference plane 23 of the lens array 2, the lens array 2 is fitted into the upper mirror cylinder 1. By this operation, the centers of the two apertures 1a and 1b provided in the upper mirror cylinder 1 and the optical axes of the lenses 2a and 2b are positioned with respect to each other in the X direction and the Y direction, and thus the diaphragm decentration amount is kept to no more than the designed value.

By putting a reference plane 15 defined for the upper mirror cylinder 1 into contact with a reference plane 21 defined for the lens array 2, the lens array 2 and the upper mirror cylinder 1 are positioned with respect to each other in the Z axis direction, and so the lenses and the apertures are positioned with respect to each other in the optical axis direction.

Figure 5:
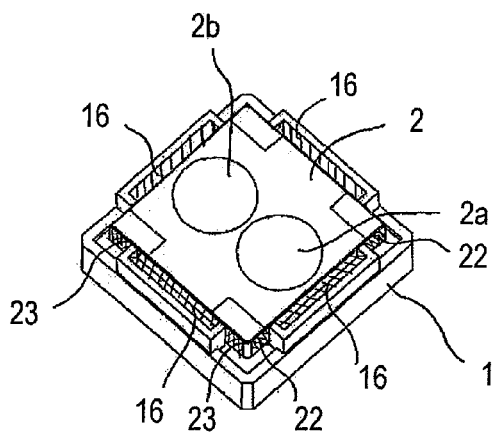
FIG. 5 is an isometric view of the lens array and the upper mirror cylinder of the compound eye camera module according to Embodiment 1 of the present invention.

In the state where the upper mirror cylinder 1 and the lens array 2 are positioned in the X, Y and Z directions, four slanting faces 16 of the upper mirror cylinder 1 and the end faces of the lens array 2 are bonded together to fix the upper mirror cylinder 1 and the lens array 2 to each other. FIG. 5 is an isometric view of the lens array 2 and the upper mirror cylinder 1 bonded and fixed to each other as seen from the side of the imaging element 9.

Figure 6:
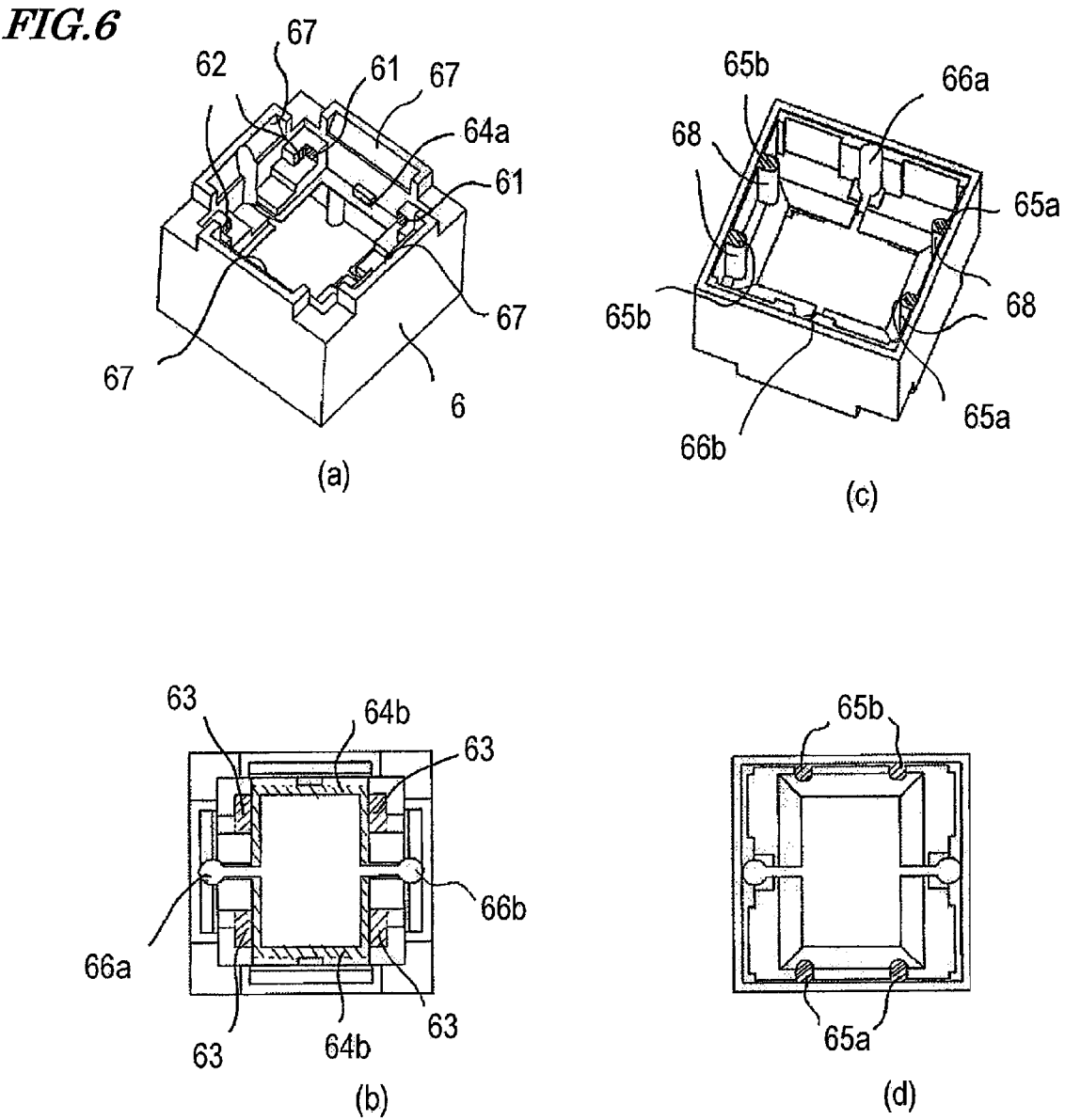
FIGS. 6(a) through (d) show a light shielding block of the compound eye camera module according to Embodiment 1 of the present invention.

FIG. 6(a) through FIG. 6(d) show the light shielding block 6. FIG. 6(a) is an isometric view of the light shielding block 6 as seen from the side of the subject. FIG. 6(b) is a front view of the light shielding block 6 as seen from the side of the subject. FIG. 6(c) is an isometric view of the light shielding block 6 as seen from the side of the imaging element 9. FIG. 6(d) is a bottom view of the light shielding block 6 as seen from the side of the imaging element 9.

For the light shielding block 6, a plurality of reference planes are defined for positioning at the time of assembly. Elements of the compound eye camera module 100 are assembled and positioned with respect to one another based on a reference plane 62 for the X direction, a reference plane 61 for the Y direction, and reference planes 65a and 65b for the Z direction (optical axis direction). The elements which are to be positioned are the lens array 2, the light shielding wall 5, and the second optical filter 4. The reference planes 65a and 65b are on the same plane.

First, positioning of the lens array 2 will be described. The lens array 2 are positioned and fixed with respect to the upper mirror cylinder 1. The size of bonding grooves 16 of the upper mirror cylinder 1 is determined such that the reference planes 22 and 23 of the lens array 2 are not hidden even after the lens array 2 is assembled with the upper mirror cylinder 1. As shown in FIG. 5, the reference planes 22 and 23 of the lens array 2 are exposed by setting the size of the bonding grooves 16 of the upper mirror cylinder 1 to be shorter than that of the external shape of the lens array 2.

The reference plane 22 defined for the lens array 2 is held against the reference plane 61 defined for the light shielding block 6 to position the lens array 2 and the light shielding block 6 with respect to each other in the Y direction. The reference plane 23 defined for the lens array is held against the reference plane 62 defined for the light shielding block 6 to position the lens array 2 and the light shielding block 6 with respect to each other in the X direction. Thus, the lens array 2 fixed to the upper mirror cylinder 1 and the light shielding block 6 are positioned with respect to each other in the X and Y directions. By this, the upper mirror cylinder 1 and the light shielding block 6 can be positioned with respect to each other in the X and Y directions using the reference planes 22 and 23 of the lens array 2. By positioning the upper mirror cylinder 1 and the light shielding block 6 based on the lens array 2, even separate elements can be positioned at the accuracy of the elements of the light shielding block 6.

Figure 7:
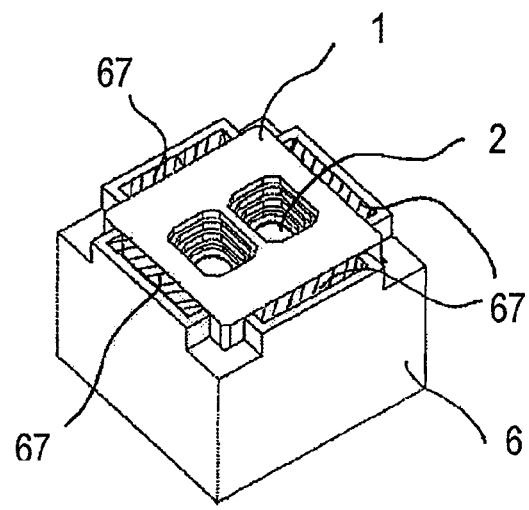
FIG. 7 is an isometric view of the light shielding block and the upper mirror cylinder of the compound eye camera module according to Embodiment 1 of the present invention.

For positioning in the Z direction, reference planes 24 defined for the lens array 2 are held against reference planes 63 defined for the light shielding block 6. The reference planes 63 provide a necessary flange back distance and a necessary parallel degree with respect to the reference planes 65a and 65b in the Z direction. By holding and fixing the lens array 2 against each reference plane of the light shielding block 6, the tilt of the lens array 2 can be suppressed and a flange back distance within a designed value can be easily provided. In the state where the light shielding block 6 and the lens array 2 are positioned in the X, Y and Z directions, the upper mirror cylinder 1 and the light shielding block 6 are bonded and fixed along bonding grooves 67 formed in the light shielding block 6. FIG. 7 is an isometric view of the upper mirror cylinder 1 and the light shielding block 6 bonded and fixed together as seen from the side of the subject.

Figure 8:
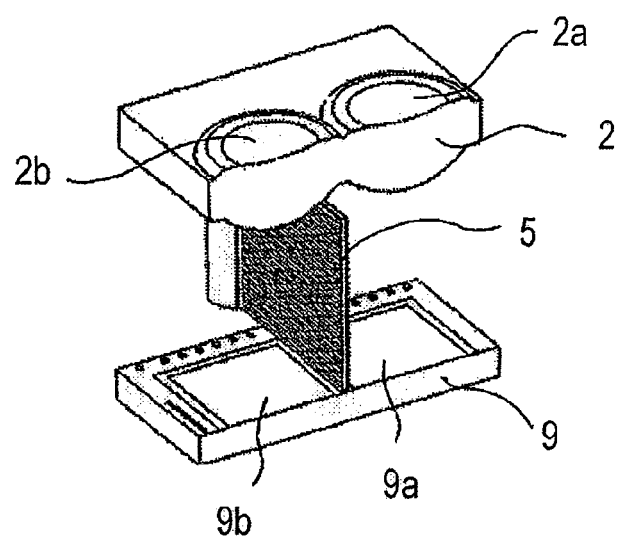
FIG. 8 is an isometric view of a cross-section showing the positional relationship of the imaging element and a light shielding wall of the compound eye camera module according to Embodiment 1 of the present invention.

Next, positioning of the light shielding wall 5 will be described. The light shielding wall 5 divides optical paths of light which has been transmitted through the two lenses. In order to allow the imaging element 9 to take an image by the two imaging elements 9a and 9b in a divided manner, the light shielding wall 5 prevents the light which has been transmitted through the lens 2a from being incident on the imaging area 9b not corresponding to the lens 2a, and vice versa. FIG. 8 is an isometric view showing a cross-section of the lens array 2, the light shielding wall 5 and the imaging element 9. As shown in FIG. 8, the light shielding wall 5 is provided along the border between the two imaging areas 9a and 9b of the imaging element 9. Since the center of each of the two imaging areas 9a and 9b matches the center of each of the optical axes of the lenses 2a and 2b, the light shielding wall 5 may be positioned with respect to the lens array 2. Since the lens array 2 is positioned and fixed with respect to the light shielding block 6, the light shielding wall 5 may be positioned with respect to the light shielding block 6. The light shielding wall 5 only needs to divide the area of the imaging element 9 into two areas arranged in the Y direction, which is the base direction. Therefore, the light shielding wall 5 needs to be positioned with respect to the reference plane 61 of the light shielding block 6.

As shown in FIG. 1, the light shielding wall 5 includes two cylinders 51a and 51b for positioning, and the light shielding block 6 has reference holes 66a and 66b at true positions regulated with respect to the reference plane 61. By fitting the cylinders 51a and 51b into the reference holes 66a and 66b, the positioning in the Y direction is performed. The positioning in the Z direction is performed at positions on the same plane as the reference planes 65a and 65b of the light shielding block 6. Namely, the light shielding wall 5 is located just above the first optical filter 7. The light shielding block 6 is formed of a light non-transmissive material, like the upper mirror cylinder 1. Inner circumferential faces of the light shielding wall 5 and the light shielding block 6 are preferably treated to shield light by various surface treatment (e.g., roughening, plating, blacking, etc.), creping, or tapering, in order to minimize the reflection of light by the inner circumferential faces.

In order to make such a reflection-suppressing shape of the light shielding wall easier to mold, the light shielding wall 5 and the light shielding block 6 are provided as separate members and assembled to form the light shielding block having the light shielding wall. Alternatively, the light shielding wall 5 and the light shielding block 6 may be integrally molded to reduce the cost of the components and improve the positional accuracy of the light shielding wall.

The light shielding block 6 has a recess 64a for holding and fixing the second optical filter 4 in a face on the side of the lens array 2. The second optical filter 4 is fixed as follows. The second optical filter 4 is fitted into the recess 64a, positioned in the Z direction based on the reference planes 65a and 65b of the light shielding block 6 and put into contact with the reference plane 64b guaranteed to be parallel to a certain extent. As a result, the tilt of the second optical filter 4 can be suppressed.

Figure 9:
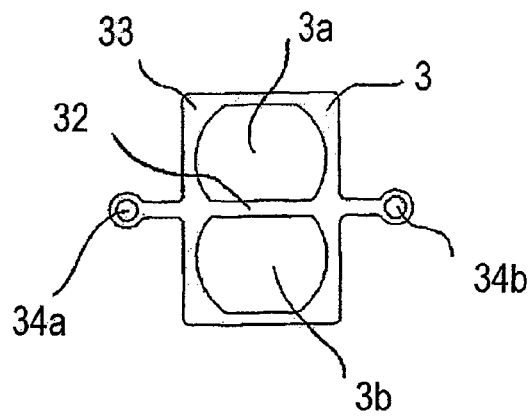
FIG. 9 is a front view of a light shielding film according to Embodiment 1 of the present invention.

The light shielding film 3 is located between the second optical filter 4 and the lens array 2. The light shielding wall 5 divides the imaging area into two imaging areas 9a and 9b, but the height of the light shielding wall 5 can be merely up to just below the second optical filter 4. For example, in order to prevent the light beam which has passed the lens 2a from passing the second optical filter 4 to form an image in the imaging area 9b as unnecessary light, the light shielding film 3 is provided on the second optical filter 4. As shown in FIG. 9, the light shielding film 3 includes a light shielding portion 32 located to form two openings 3a and 3b independent from each other and an outer cylinder portion 33 for holding the light shielding portion 32. It is desirable that the light shielding portion 32 positionally matches the light shielding wall 5 in the X and Y directions. In order to realize this, the light shielding film 3 is structured to be positioned with respect to the light shielding wall 5. By fitting cylinders 52a and 52b of the light shielding wall 5 into reference holes 34a and 34b of the light shielding film 3, the light shielding portion 32 and the light shielding wall 5 are positioned with respect to each other. As a result, the two openings 3a and 3b are respectively provided on the optical axes of the two lenses 2a and 2b.

After the upper mirror cylinder 1 having the lens array 2 fixed thereto is positioned and fixed with respect to the light shielding block 6 assembled with the light shielding wall 5, the light shielding block 6 is positioned with respect to the imaging element 9 and fixed on the first optical filter 7 such that the direction connecting the optical axes of the lenses 2a and 2b matches the direction in which the pixels included in the imaging element 9 are arranged.

The imaging element 9 is in contact with a face of the first optical filter 7 which faces the imaging element 9. The light shielding block 6 is fixed on a face of the first optical filter 7 which fades the light shielding block 6. As shown in FIG. 2, the first optical filter 7 is in contact with the imaging face of the imaging element 9. Since the first optical filter 7 has a substrate formed of glass, the positional relationship between both of two faces of the filter is infinitely close to parallel. Therefore, the face of the first optical filter 7 which is in contact with the reference planes 65a and 65b of the light shielding block 6 is considered to be parallel to the imaging face. Accordingly, by putting the reference planes 65a of the light shielding block 6 into contact with a portion 7a of the first optical filter 7 which protrudes outside the imaging element 9 and similarly putting the reference planes 65b into contact with a portion 7b of the first optical filter 7 which protrudes outside the imaging element 9, the relative tilt of the lens array 2 and the imaging element 9 can be suppressed and also the focal point deviation can be made infinitely close to zero.

For calculating the distance to the object with a stereo view, it is necessary to extract the parallax amount. The parallax amount is calculated as follows. One of images obtained from the two imaging areas 9a and 9b is used as the base image, and the other image is used as the reference image. On the reference image, points corresponding to points in the base image are searched for. Thus, the parallax amount is found. Therefore, if unnecessary reflected light is imaged in one of the imaging areas, the distance measuring accuracy is significantly deteriorated.

Figure 10:
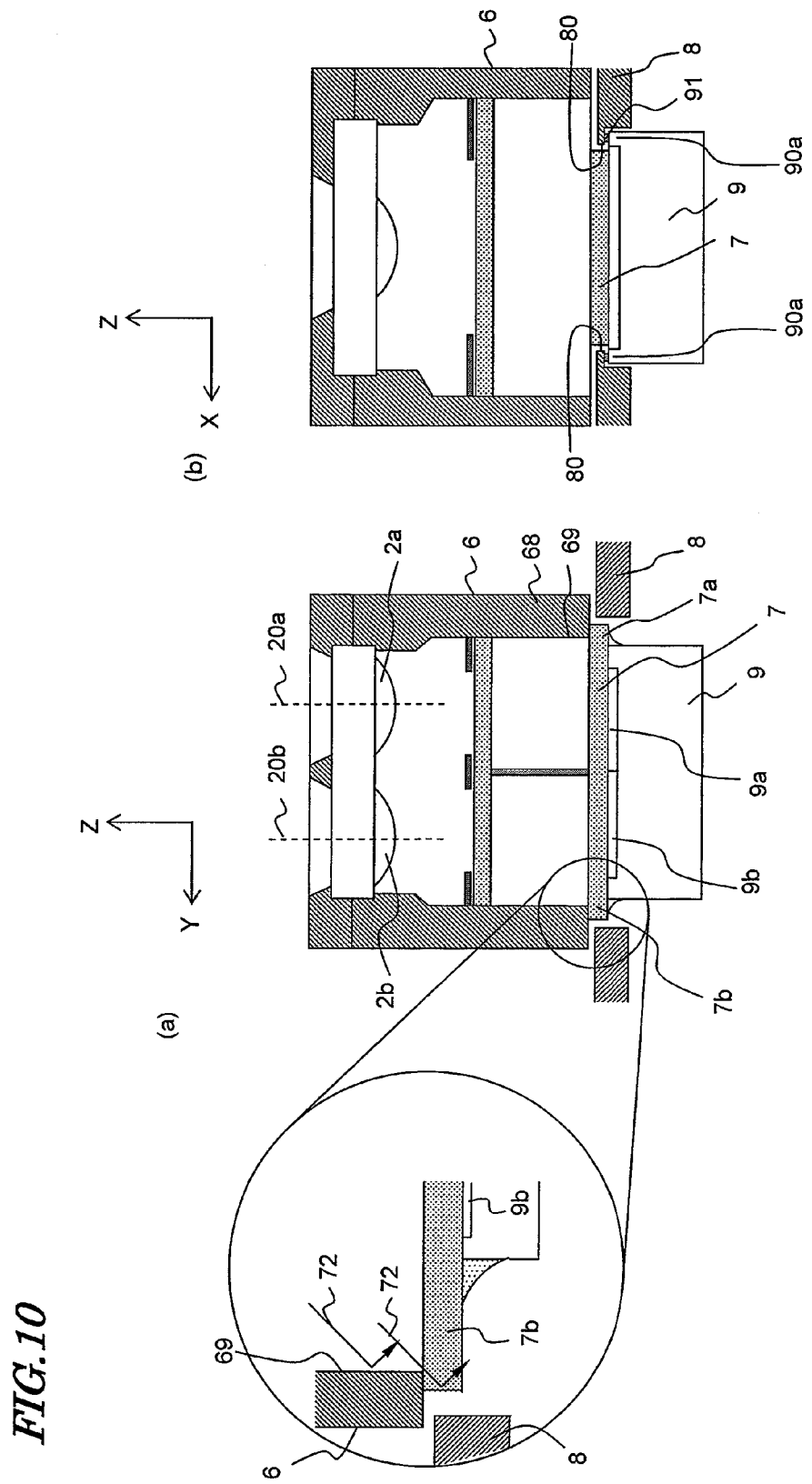
FIGS. 10(a) and (b) are cross-sectional views of the compound eye camera module according to Embodiment 1 of the present invention.

In the compound eye camera module 100, the first optical filter 7 is provided to protrude outside the imaging element 9 in the base direction, and assembly reference planes are defined for the protruding portions 7a and 7b. FIG. 10(a) and FIG. 10(b) are cross-sectional views of the compound eye camera module 100. FIG. 10(a) also shows an enlarged view of the protruding portion 7b of the first optical filter 7 and the vicinity thereof.

End faces of the first optical filter 7 in the base direction are distanced from the imaging element 9 by the width of the protruding portions 7a and 7b. Therefore, unnecessary light 72 reflected by each of the end faces of the first optical filter 7 in the base direction is prevented from being imaged in the imaging area 9a or 9b.

The light shielding block 6 is fixed to the protruding portions 7a and 7b of the first optical filter 7, and an inner wall 69 of the light shielding block 6 in the range in which the light shielding wall 5 is provided is located outer to both of the ends of the imaging element 9 in the base direction (Y direction). Owing to this, the inner wall 69 of the light shielding block 6 can be distanced from the imaging area 9a or 9b. Therefore, unnecessary light 72 reflected by the inner wall 69 is prevented from being imaged in the imaging area 9a or 9b. In addition, by locating a beams 68 in the light shielding block for forming a second reference plane defined for the light shielding block 6 as far as possible from the imaging areas, unnecessary light can be prevented from being reflected by the beams 68 and thus imaged in the imaging area 9a or 9b.

The unnecessary light reflected by the end faces, of the first optical filter 7, in the direction perpendicular to the base direction (in the X direction) is imaged in the imaging areas 9a and 9b at the same time. Therefore, the influence of this unnecessary reflected light on the distance measuring accuracy is small. For this reason, even if the end faces of the first optical filter 7 in the direction perpendicular to the base direction are close to the imaging areas, this does not much influence on the distance measuring accuracy. Owing to such a structure, the module can be made compact while the distance measuring accuracy is improved.

As described above, in this embodiment, the first optical filter 7 includes the portions 7a and 7b protruding outside both of the ends of the imaging element 9 in the base direction, and the protruding portions 7a and 7b are used as reference planes and are put into contact with the reference planes 65a and 65b of the light shielding block 6. Owing to this, the module can be made compact and the influence of the unnecessary light from the end faces of the first optical filter 7 on the distance measuring accuracy can be reduced.

In this embodiment, the substrate of the first optical filter 7 is formed of glass, but may be formed of a resin as long as both of the faces of the filter are guaranteed to be parallel to each other to a certain extent. By adopting a filter having a resin substrate, dust caused by chipping of the end faces of the filter can be prevented from entering the imaging area more than a filter having a glass substrate.

As shown in FIG. 10(b), the imaging element 9 has portions 90a protruding outside both of end portions 80 of the opening of the substrate 8 in the direction perpendicular to the base direction (in the X direction). The protruding portions 90a are each provided with an electrode terminal 91 which is electrically connected to the substrate 8. The protruding portions 90a and a rear face of the substrate 8 are fixed to each other, and the electrode terminals 91 are electrically connected to the substrate 8. Herein, the rear face of the substrate 8 is a face opposite to a face of the substrate 8 on the side of the lens array 2. The imaging areas 9a and 9b and the electrode terminals 91 are located on the same face side of the imaging element 9 (on the side of the imaging face). Also in a structure in which the electrode terminals 91 are located outside the opening of the substrate 8 to put the first optical filter 7 into contact with the imaging face, the electrode terminals 91 can be connected to the rear face of the substrate 8. The perimeter of each electrode terminal 91 may be reinforced by an underfill agent.

Figure 11:
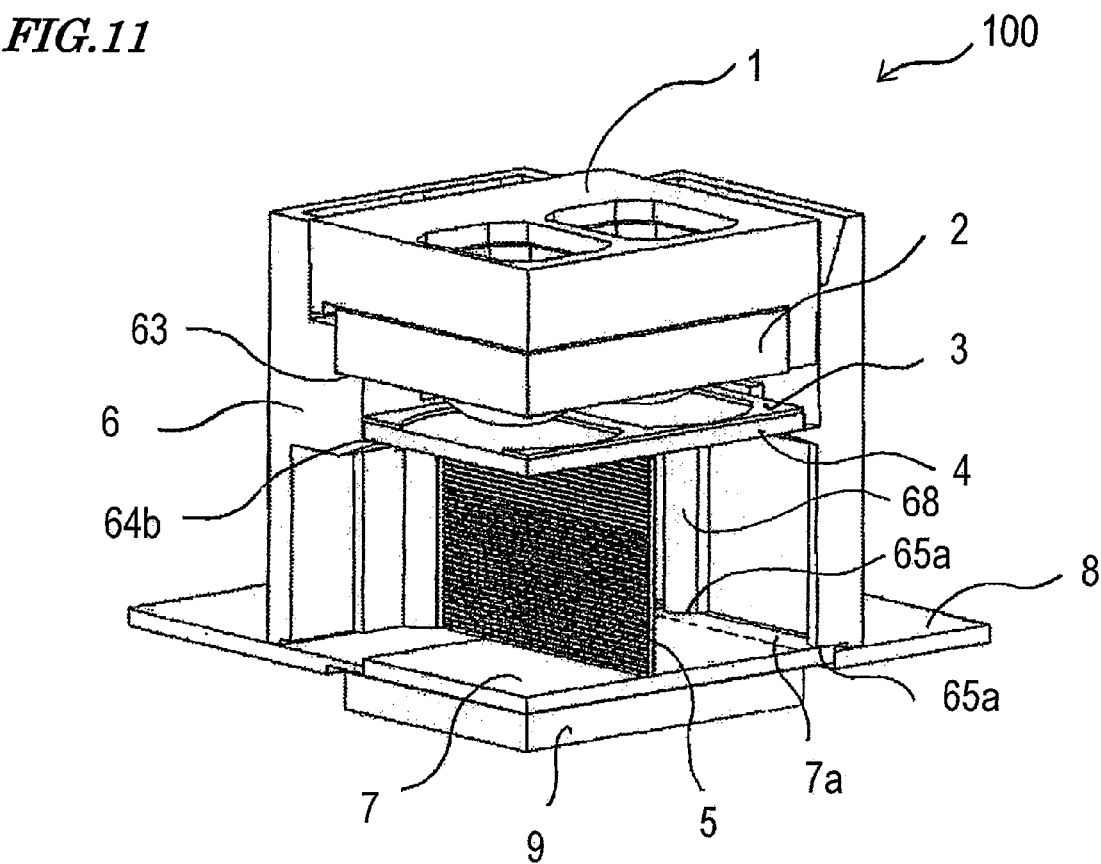
FIG. 11 is an isometric view showing a cross-section of the compound eye camera module according to Embodiment 1 of the present invention.

FIG. 11 is an isometric view showing a cross-section of the compound eye camera module in this embodiment which is taken along the XZ plane and the YZ plane. In FIG. 11, the reference plane 65a (and 65b) of the light shielding block 6 is put into contact with the protruding portion 7a (and 7b) of the first optical filter 7 provided just above, and in contact with, the imaging element 9. The lens array 2 is positioned in contact with the reference plane 63, and the second optical filter 4 is positioned in contact with the reference plane 64b. As a result, the relative tilt of the lens array 2 and the second optical filter 4 with respect to the imaging element 9 can be suppressed down to the value of the parallel degree among the reference planes defined for the light shielding block 6.

By adopting the above-described structure, there is only one cause left for the focal point deviation of the lenses, which is the variance of the distance between the reference planes of the light shielding block 6 (i.e., the distance from the reference planes 65a and 65b to the reference plane 63). By integrally forming the lenses, the flange back difference among the lenses which transmit light of the same wavelength can be made very small.

The upper mirror cylinder 1 and the lens array 2 are positioned and fixed with respect to each other by putting the reference planes defined for the upper mirror cylinder 1 into contact with the reference planes defined for the lens array 2. Owing to this, the diaphragm decentration, which is the deviation of the center of each of the optical axes of the lenses 2a and 2b with respect to the center of each of the apertures 1a and 1b, can be suppressed. As a result, the error amount of the parallax resulting from such deviation can be made negligible.

The first optical filter 7 is shaped to protrude, at both ends thereof, outside the imaging areas of the imaging element in the base direction, and the protruding portions are put into contact with the reference planes 65a and 65b of the light shielding block 6. Owing to this, the effective imaging area of the imaging element 9 can be utilized to the maximum possible degree with no need to consider the unnecessary reflected light. As a result, the distance between the lenses 2a and 2b, i.e., the base length can be made longer, which can improve the distance measuring performance.

In order to suppress the tilt of the second optical filter 4, the second optical filter 4 larger than the effective imaging area of the imaging element 9 is put into contact with the reference plane 64b defined for the light shielding block 6. Owing to this, the tilt of the second optical filter 4 can be suppressed like the tilt of the lens array 1.

As described above, according to Embodiment 1 of the present invention, the parallax error caused when the distance to the subject is measured can be made very small and thus the distance measuring accuracy can be improved, even where the compound eye camera module is assembled in a simple manner without providing a complicated and high-cost adjusting mechanism.

In this embodiment, the two imaging areas have substantially the same size. The present invention is not limited to this. For example, the areas may be non-uniform in consideration of the parallax which is to be caused.

In the case where the lenses are molded integrally and shaped as symmetrically as possible, the linear expansion coefficient is uniform and the shape is substantially symmetrical. For this reason, the shape of the lenses is also changed uniformly by a temperature change. By detecting the temperature using a thermistor or the like, the inter-lens distance at each temperature can be estimated. As a result, the parallax amount caused by the temperature change can be corrected by estimating the change of the position of the optical axis of each lens, and thus a certain degree of distance measuring accuracy can be guaranteed.

Now, with reference to FIG. 12 and FIG. 13, an example of specific structures and sizes of the first optical filter 7, the substrate 8 and the imaging element 9 will be described.

Figure 12:
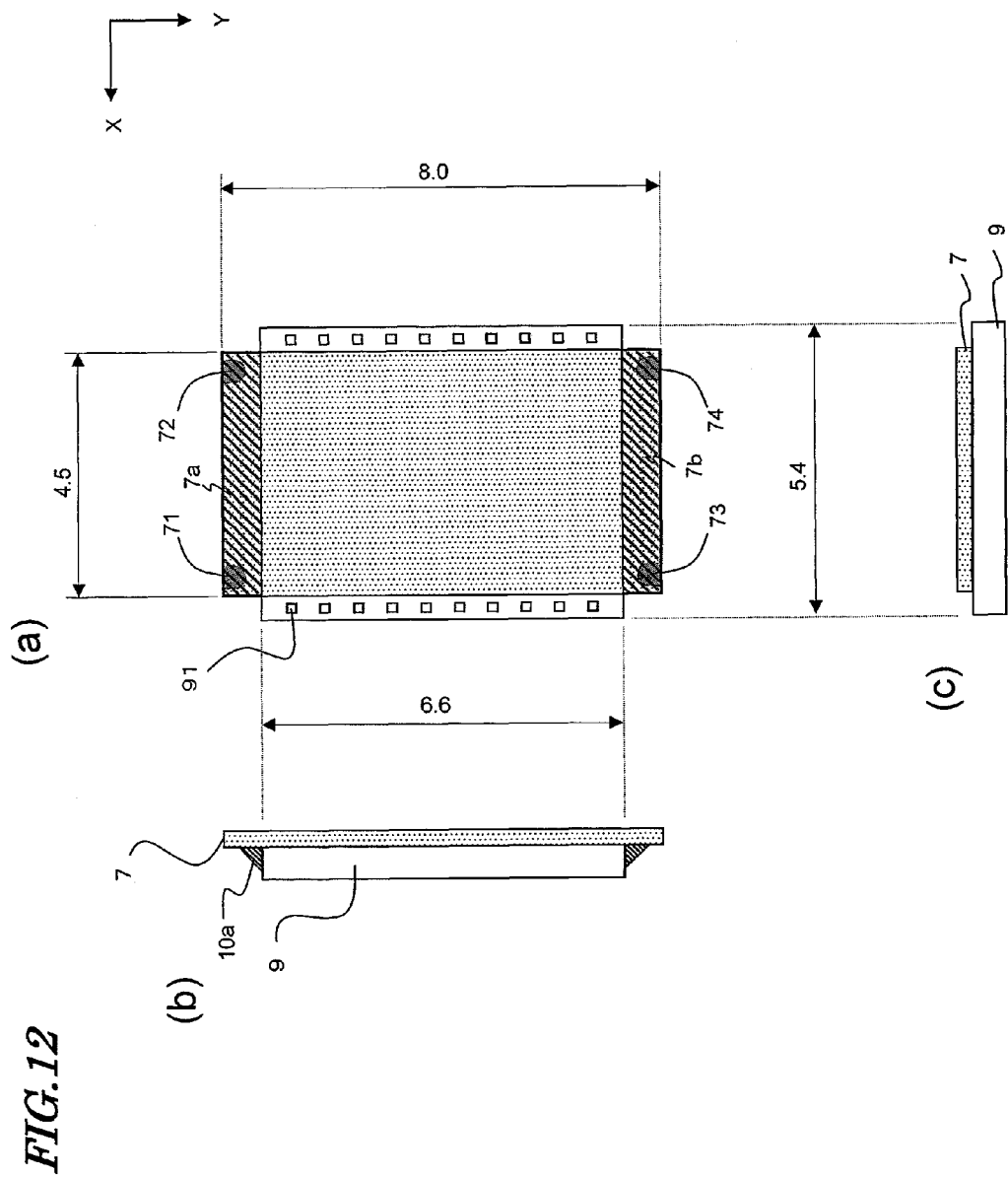
FIGS. 12(a) through (c) show a state where the optical filter and the imaging element are mounted according to Embodiment 1 of the present invention.

FIG. 12 shows a state where the first optical filter 7 and the imaging element 9 are mounted. FIG. 12(*a*) is a front view as seen from the side of the subject, FIG. 12(*b*) is a cross-sectional view thereof taken along the Y direction, and FIG. 12(*c*) is a cross-sectional view thereof taken along the X direction.

The center of the first optical filter 7 is matched to the center of the imaging element 9. The first optical filter 7 and the imaging element 9 are positioned such that the sides thereof are parallel in the X direction and the Y direction, and are stuck together. The first optical filter 7 and the imaging element 9 are stuck together in the state where the longer sides thereof are parallel to the Y direction and the shorter sides thereof are parallel to the X direction and where the center lines of the first optical filter 7 and the imaging element 9 in the Y direction match each other and also the center lines of the first optical filter 7 and the imaging element 9 in the X direction match each other. In the example shown in the figure, the first optical filter 7 has a size of 8×4.5 mm, and the imaging element 9 has a size of 6.6×5.4 mm.

When the first optical filter 7 and the imaging element 9 are stuck together, the imaging element 9 has protruding portions each of 0.45 mm in the X direction due to the size difference. In these protruding portions, a plurality of electrode terminals 91 electrically connected to the substrate 8 are provided.

In the Y direction, the first optical filter 7 has protruding portions each of 0.7 mm outside the imaging element 9. Four corners of the protruding portions are put into contact with the mirror cylinder reference planes 71, 72, 73 and 74.

An appropriate amount of the adhesive 10a is flown between a rear face of each of the protruding portions of the first optical filter 7 and the end faces of the imaging element 9 to fix the first optical filter 7 and the imaging element 9 to each other.

Figure 13:
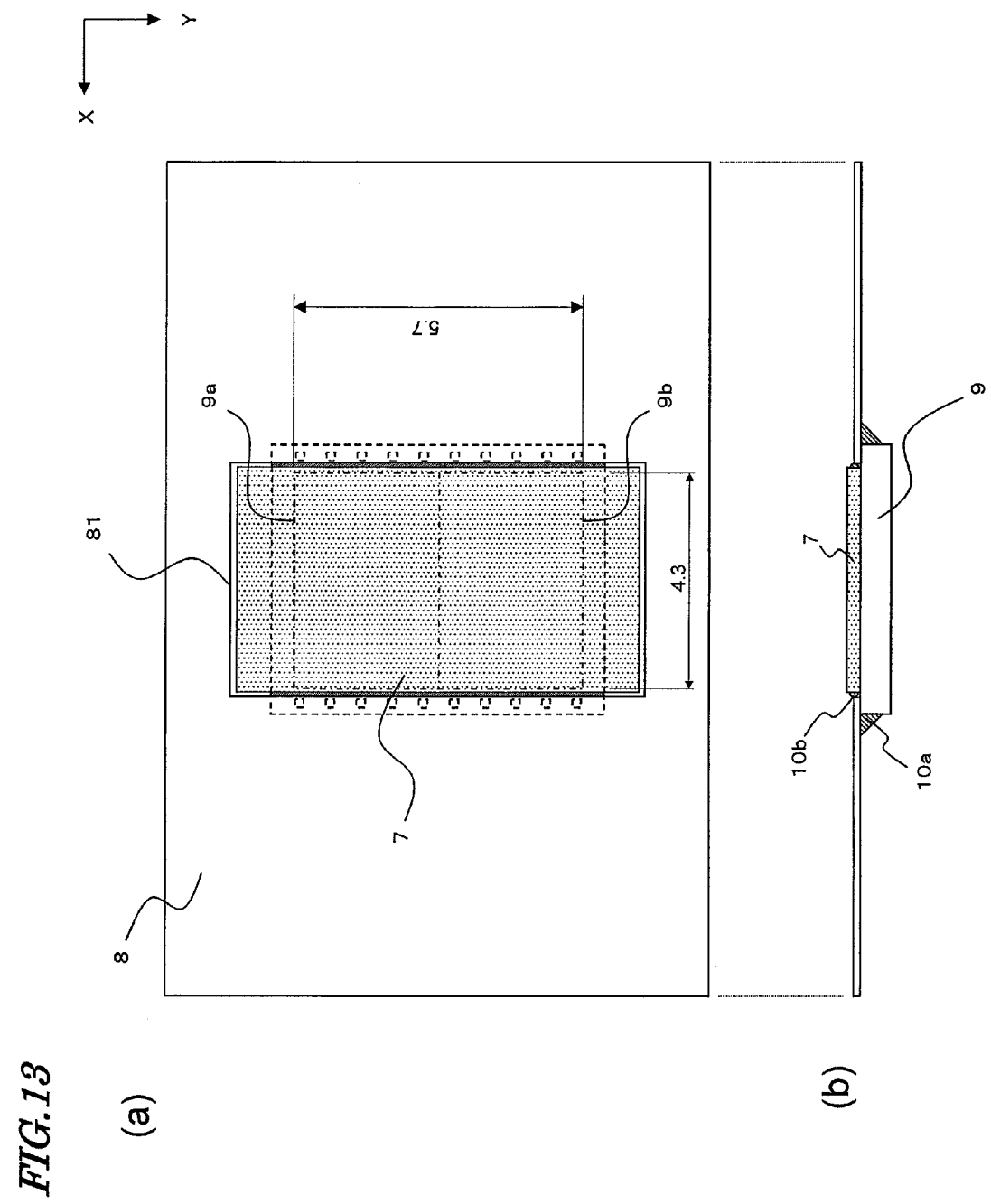
FIG. 13(a) and (b) show a state where the imaging element is fixed to a substrate according to Embodiment 1 of the present invention.

FIG. 13 shows a state where the imaging element 9 is fixed to the substrate 8. FIG. 13(*a*) is a front view thereof as seen from the side of the subject. FIG. 13(*b*) is a cross-sectional view thereof taken along the X direction.

In the substrate 8, the opening 81 having substantially the same size as that of the first optical filter 7 is formed. Into the opening 81, the first optical filter 7 is fitted. A gap between the first optical filter 7 and the opening 81 along each side is, for example, about 0.05 mm.

The imaging element 9 is flip-chip-mounted on the substrate 8 face down and is electrically connected to the electric circuit formed on the substrate 8. In the state where the first optical filter 7 is in contact with the imagine face of the imaging element 9, the adhesives 10a and 10b are flown so as to surround the imaging element 9. Thus, the imaging element 9 is mechanically fixed to the substrate 8 and the first optical filter 7 which are in contact with each other. This prevents dirt, dust or the like from entering the imaging face of the imaging element 9. The imaging areas 9a and 9b each have a size of about 5.7×4.3 mm, and are covered with the first optical filter 7 both along the longer sides and the shorter sides.

Embodiment 2

Figure 14:
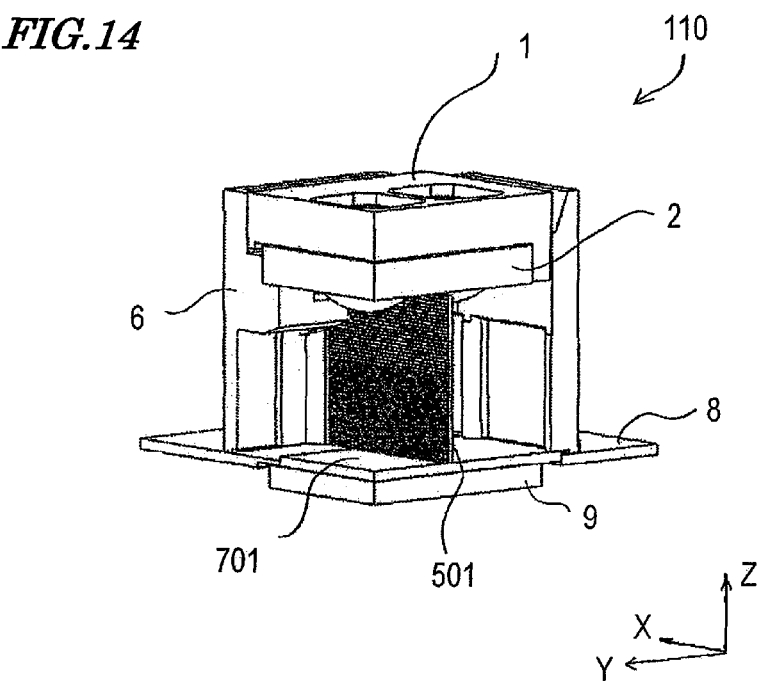
FIG. 14 is an isometric view showing a cross-section of a compound eye camera module according to Embodiment 2 of the present invention.

FIG. 14 is an isometric view showing a cross-section of a compound eye camera module 110 according to Embodiment 2 of the present invention which is taken along the XZ plane and the YZ plane. The compound eye camera module 110 is different from the compound eye camera module 100 in Embodiment 1 in including neither the second optical filter 4 nor the light shielding film 3 and also in the shape of a light shielding wall 501 and the spectral characteristic of a first optical filter 701.

In Embodiment 1, the spectral characteristic of transmitting only green light is provided by the first optical filter 7 and the second optical filter 4. By contrast, in Embodiment 2, the necessary spectral characteristic is provided only by the first optical filter 701.

In Embodiment 2, the second optical filter 4 is not necessary, and so the height of the light shielding wall 501 can be extended to just below the lenses of the lens array 2 facing the imaging element. As a result, the light shielding film 3 for shielding the unnecessary light transmitted through the second optical filter 4 is also made unnecessary.

Owing to the structure of the compound eye camera module 110, like in the case of the compound eye camera module 110, the relative tilt and diaphragm decentration among the imaging element, the lens array and the optical filter can be suppressed, while the number of elements can be decreased to reduce the cost.

In the above example, the optical filter for transmitting only the green light is described. Needless to say, substantially the same effect is provided where the first optical filter 701 is structured to transmit only a light beam of a single wavelength, for example, near infrared light. Needless to say, each lens of the lens array 2 is designed to optimize the optical characteristics at the selected wavelength.

Embodiment 3

Figure 15:
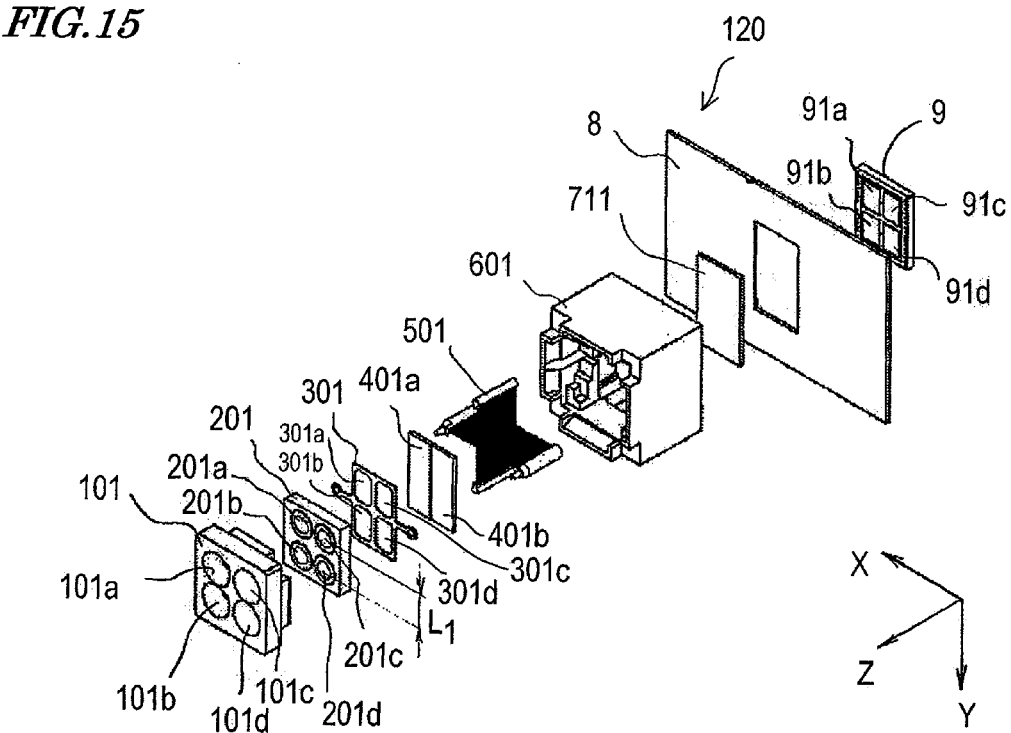
FIG. 15 is an exploded isometric view showing a cross-section of a compound eye camera module according to Embodiment 3 of the present invention.
Figure 16:
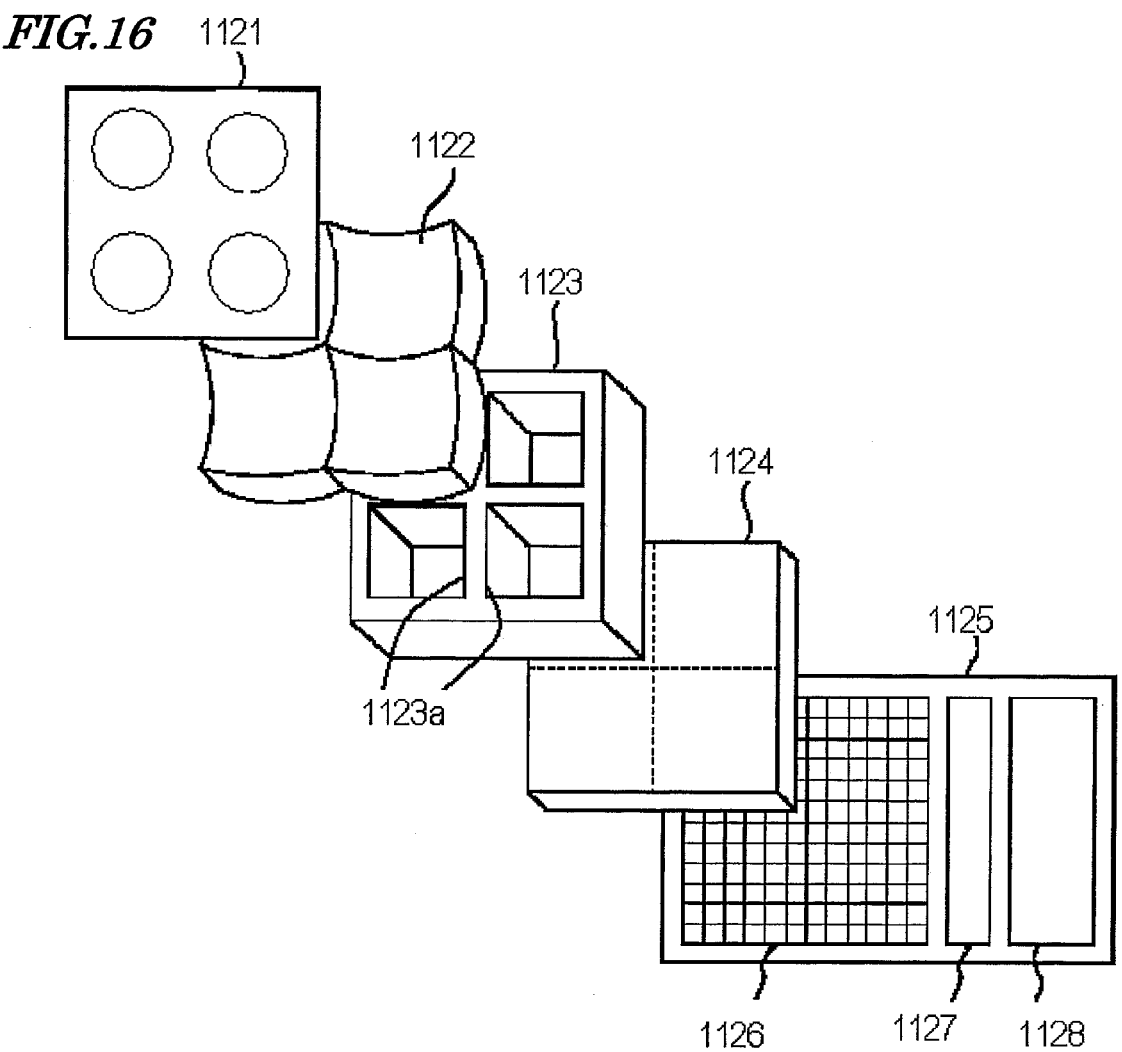
FIG. 16 is an exploded isometric view of a conventional compound eye camera module.
Figure 17:
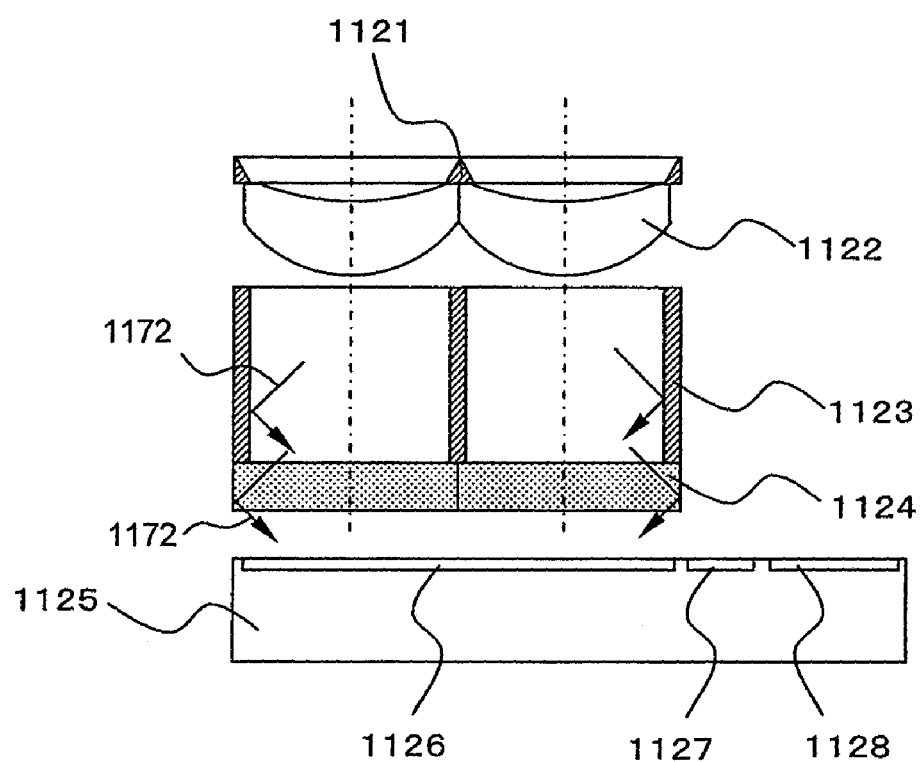
FIG. 17 is a cross-sectional view of a conventional compound eye camera module.

FIG. 15 is an exploded isometric view of a compound eye camera module 120 according to Embodiment 3 of the present invention. The compound eye camera module 100 in Embodiment 1 is a two-eye camera module in which the lens array includes two lenses. The compound eye camera module 120 is a four-eye camera module in which the lens array includes four lenses.

A lens array 201 includes integral four single lenses 201a through 201d which are located on the same plane parallel to the XY plane. Optical axes of the four lenses 201a through 201d are parallel to the Z axis and are located at four apexes of a phantom rectangle parallel to the XY plane. Two of the lenses 201a through 201d are designed to fulfill the optical specifications such as MTF or the like which are required of light of one of the three primary colors, i.e., of a red, blue or green wavelength range. The remaining two lenses are designed to fulfill the optical specifications such as MTF or the like which are required of light of a near infrared wavelength range. Specifically, the lenses 201a and 201b are designed to be optimum for the light of the green wavelength range, and the lenses 201c and 201d are designed to be optimum for the light of the near infrared wavelength range. The lenses 201a and 201b form a lens pair for stereo viewing and are located L1 mm away from each other in the base direction (Y direction). The lenses 201c and 201d form a lens pair for stereo viewing and are located L1 mm away from each other in the base direction (Y direction). The lenses 201a through 201d are integrally formed of, for example, a glass or plastic material. The lenses 201a through 201d are arranged such that the flange back deviation between the lenses for the same wavelength, for example, between the lenses for green or between the lenses for near infrared is, as close as possible to zero.

The lens array 201 is positioned and fixed with respect to an upper mirror cylinder 101. Like in Embodiment 1, reference planes defined for the X direction and the Y direction are put into contact with each other to position and fix the lens array 201 and the upper mirror cylinder 101 with respect to each other in the X and Y directions. As a result, the decentration deviation of each of a aperture 101a corresponding to the lens 201a, a aperture 101b corresponding to the lens 201b, a aperture 101c corresponding to the lens 201c, and a aperture 101d corresponding to the lens 201d is suppressed to be minimum.

The lenses 201a through 201d each cause light from a subject (not shown) to pass a second optical filter 401a or 401b and a first optical filter 711 and then to form an image on the imaging element 9.

The second optical filters 401a and 401b are located between the lens array 201 and a light shielding block 601. The second optical filters 401a and 401b are located on the same plane parallel to the XY plane, like the lens array 201. The second optical filter 401a has a spectral characteristic of cutting the near infrared wavelength range, whereas the second optical filter 401b has a spectral characteristic of cutting the visible wavelength range. The optical filters for transmitting light of the same wavelength range are integrally formed. The optical filter 401a is located on imaging areas 91a and 91b of the imaging element 9, and the optical filter 401b is located on imaging areas 91c and 91d of the imaging element 9. The first optical filter 711 has a spectral characteristic of cutting light of both the green wavelength range and the near infrared wavelength range, and like in Embodiment 1, is in contact with the imaging face of the imaging element 9.

The imaging element 9 is formed of a CCD and includes a great number of pixels arranged two-dimensionally in length and width directions. An effective pixel area of the imaging element 9 is divided into the four imaging areas 91a through 91d. The four imaging areas 91a through 91d are respectively located on the optical axes of the four lenses 201a through 201d. Owing to this, an image of the subject formed of only one of red, green, blue and infrared wavelength components is independently formed on each of the four imaging areas 91a through 91d. Specifically, light from the subject transmitted through the lens 201a is transmitted through the second optical filter 401a and the first optical filter 711, and light of only the green wavelength range forms an image of the subject on the imaging area 91a. Similarly, light from the subject transmitted through the lens 201b is transmitted through the second optical filter 401a and the first optical filter 711, and light of only the green wavelength range forms an image of the subject on the imaging area 91b. Light from the subject transmitted through the lens 201c is transmitted through the second optical filter 401b and the first optical filter 711, and light of only the infrared wavelength range forms an image of the subject on the imaging area 91c. Light from the subject transmitted through the lens 201d is transmitted through the second optical filter 401b and the first optical filter 711, and light of only the infrared wavelength range forms an image of the subject on the imaging area 91d.

The upper mirror cylinder 101 has four apertures 101a through 101d in correspondence with the four lenses 201a through 201d of the lens array 201. The upper mirror cylinder 101 is formed of a light non-transmissive material, and prevents unnecessary external light from being incident on the lenses 201a through 201d except through the apertures 101a and 101d.

The light shielding wall 501 is located in the shape of a cross with respect to an axis which is parallel to the Z axis and passes the substantial center of the light shielding block 601. Like in Embodiment 1, the light shielding wall 501 is positioned and fixed with respect to the light shielding block 601. One face of the light shielding wall is along the XZ plane, and the other face thereof is along the YZ plane. By incorporating the light shielding wall 501 into the light shielding block 601, four openings are formed and located on the optical axes of the four lenses 201a through 201d respectively.

The light shielding wall 501 divides the effective pixel area of the imaging element 9 into the four imaging areas 91a through 91d and also prevents light which has passed, for example, the lens 201a from entering the imaging areas 91b and 91c adjacent to the imaging area corresponding to the lens 201a as unnecessary light.

Like in Embodiment 1, a light shielding film 301 also prevents light which has passed, for example, the lens 201a from passing the second optical filters 401a and 401b and entering the imaging areas 91b and 91c adjacent to the imaging area corresponding to the lens 201a as unnecessary light. As shown in FIG. 15, the light shielding film 301 is located in the shape of a cross to form four independent openings 301a through 301d. Like the light shielding wall 501, one face of the light shielding film 301 is along the XZ plane, and the other face thereof is along the YZ plane. The four openings 301a through 301d are located on the optical axes of the four lenses 201a through 201d respectively. Like in Embodiment 1, the reference shaft of the light shielding wall 501 is fitted into the reference hole formed in the light shielding film 301 to position and fix the light shielding film 301 with respect to the light shielding wall 501.

The substrate 8 has an opening of substantially the same size as that of the first optical filter 711. Into the opening, the first optical filter 711 is fitted. The imaging element 9 is flip-chip-mounted face down and is electrically connected to an electric circuit formed on the substrate 8. In the state where the first optical filter 711 is in contact with the imaging face of the imaging element 9, an adhesive is flown so as to surround the imaging element 9. Thus, the imaging element 9 is mechanically fixed to the substrate 8 and the first optical filter 711 which are in contact with each other. This prevents dirt, dust and the like from entering the imaging face of the imaging element. The imaging element 9 has an electrode formed at each of both the ends in the X direction on a top face thereof. Owing to the imaging element 9 being flip-chip-mounted, these electrodes are connected to the electrodes formed on a bottom face of the substrate 8.

The external shape of the first optical filter 711 is larger than the imaging face of the imaging element 9 in the X axis direction and is shorter than the distance between the electrodes of the imaging element 9 in the X axis direction. In the Y axis direction, the first optical filter 711 protrudes outside both of ends of the imaging element 9. The Y axis direction is the base direction of the pair of lenses 201a and 201b and is the same as the direction in which information is read from the pixels of the imaging element.

The first optical filter 711 is fixed, along a perimeter thereof, to the substrate 8 with the adhesive 10b in the state of being in contact with the imaging face of the imaging element 9 flip-chip-mounted on the substrate 8.

With the compound eye camera module having the above-described structure, the distance to the subject can be measured as follows. From images of light having the same wavelength, namely, from images obtained from the imaging areas 91a and 91b or images obtained from the imaging areas 91c and 91d, a parallax amount is obtained by arithmetic operation processing such as block matching or the like based on triangulation. Using the parallax amount, the distance to the subject can be measured. In this embodiment, the distance is measured using the images of light of two wavelength ranges, i.e., the green wavelength and the near infrared wavelength range. Therefore, the distance can be measured both day and night. Since two wavelength ranges are used, the distance can be measured even in an environment having areas which are significantly different in brightness, for example, an area in the sun and an area of shadow. A certain degree of distance measuring accuracy can be guaranteed regardless of the brightness by measuring by the green wavelength range in the area in the sun and measuring by the near infrared wavelength in the area of shadow.

In this embodiment, a pair of lenses for green light and a pair of lenses for near infrared light are used for measuring the distance. The present invention is not limited to the above-described example. In the case where all the four eyes are for the same wavelength, for example, green light or for near infrared light, the parallax can be calculated for distance measurement also for the X direction or a diagonal direction of the lenses. As compared with the case where the parallax is calculated for one direction, a higher distance measuring accuracy can be guaranteed.

In the case where an optical system is formed in which all the four eyes are for a single wavelength, the following is possible. By providing the first optical filter with a spectral characteristic of transmitting a necessary wavelength, the light shielding film 301 and the second optical filters 401a and 401b can be omitted as described above in Embodiment 2. This can reduce the number of elements of the module.

INDUSTRIAL APPLICABILITY

A compound eye camera module according to the present invention is especially useful for the technical field in which a distance to a subject is measured using image information. The present invention is applicable to, for example, a compact and thin mobile phone having a camera function, a digital still camera, a monitoring camera, a vehicle-mountable camera or the like.

The invention claimed is:
1. A compound eye camera module, comprising:
a lens array including at least two lenses having different optical axes from each other and located on the same plane;
an imaging element having two imaging areas corresponding one-to-one to the two lenses;
a light shielding block located between the lens array and the imaging element and having a light shielding wall for separating optical paths of light transmitted through the two lenses;
an optical filter located between the light shielding block and the imaging element for transmitting light of a spe- cific wavelength range among the light transmitted through the two lenses; and a substrate having an opening larger than the optical filter; wherein:

the imaging areas and the optical filter are located at a position corresponding to the opening;

the imaging element is fixed to a face of the substrate opposite to the side of the lens array;

the imaging element is in contact with a face of the optical filter which faces the imaging element;

the light shielding block is fixed to a face of the optical filter which faces the light shielding block;

the optical filter has portions protruding outside both of ends of the imaging element in a direction connecting the two optical axes of the two lenses; and the light shielding block is fixed to the protruding portions of the optical filter.

2. The compound eye camera module of claim 1, wherein:
the imaging element has portions protruding outside both of ends of the opening in the direction perpendicular to the direction connecting the two optical axes; and
the protruding portions of the imaging element and the substrate are fixed to each other.

3. The compound eye camera module of claim 2, wherein:
the imaging element has a terminal to be electrically connected to the substrate; and
the imaging areas and the terminal are located on the same face side of the imaging element.

4. The compound eye camera module of claim 1, wherein an inner wall of the light shielding block in a range in which the light shielding wall is provided is located outer to both of the ends of the imaging element in the direction connecting the two optical axes.

5. The compound eye camera module of claim 1, wherein the two lenses are positioned with respect to the light shielding block.

6. The compound eye camera module of claim 1, wherein the face of the optical filter which faces the imaging element is in contact with the imaging face of the imaging element.

7. The compound eye camera module of claim 1, wherein:
the imaging element is bonded, along an outer perimeter thereof, to the substrate and the optical filter; and
the optical filter is bonded, along an outer perimeter thereof, to the substrate.

8. The compound eye camera module of claim 1, wherein:
the imaging element is bonded, along an outer perimeter thereof, to the substrate and the optical filter;
the opening has a shape substantially the same as an external shape of the optical filter; and
at least a part of the optical filter is located inside the opening.

* * * * *

UNITED STATES PATENT AND TRADEMARK OFFICE
CERTIFICATE OF CORRECTION

PATENT NO.        : 8,106,344 B2
APPLICATION NO.   : 12/595992
DATED             : January 31, 2012
INVENTOR(S)       : Satoshi Tamaki and Tatsutoshi Suenaga It is certified that error appears in the above-identified patent and that said Letters Patent is hereby corrected as shown below:

Title Page, Item (56), "FOREIGN PATENT DOCUMENTS",
"JP 2006-080597 3/2006" (second occurrence) should be deleted as redundant; and
-- JP 2003-143459 5/2003 -- should be added.

Signed and Sealed this
Tenth Day of July, 2012

David J. Kappos
*Director of the United States Patent and Trademark Office*